United States Patent
Kulkarni et al.

(10) Patent No.: US 12,190,274 B2
(45) Date of Patent: Jan. 7, 2025

(54) DATA ANALYTICS IN SUPPLY CHAIN

(71) Applicant: SMILE AUTOMATION PVT. LTD., Pune (IN)

(72) Inventors: Sanjeev Kulkarni, Pune (IN); Liju Poulose, Mumbai (IN)

(73) Assignee: SMILE AUTOMATION PVT. LTD., Pune (IN)

( * ) Notice: Subject to any disclaimer, the term of this patent is extended or adjusted under 35 U.S.C. 154(b) by 0 days.

(21) Appl. No.: 18/413,724

(22) Filed: Jan. 16, 2024

(65) Prior Publication Data

US 2024/0152846 A1 May 9, 2024

Related U.S. Application Data

(63) Continuation of application No. PCT/IN2022/050639, filed on Jul. 14, 2022.

(30) Foreign Application Priority Data

Jul. 16, 2021 (IN) .............................. 202121032157

(51) Int. Cl.
*G06Q 10/0639* (2023.01)
*G06F 16/25* (2019.01)

(52) U.S. Cl.
CPC ..... *G06Q 10/06395* (2013.01); *G06F 16/258* (2019.01)

(58) Field of Classification Search
CPC ............ G06Q 10/06395; G06F 16/258; G06F 16/1794

See application file for complete search history.

(56) References Cited

U.S. PATENT DOCUMENTS

| | | | |
|---|---|---|---|
| 8,417,715 B1* | 4/2013 | Bruckhaus | G06Q 10/04 705/26.1 |
| 10,997,195 B1 | 5/2021 | Sekar | |
| 2017/0031969 A1 | 2/2017 | Smits et al. | |

(Continued)

OTHER PUBLICATIONS

Hu, Han, et al. "Toward scalable systems for big data analytics: A technology tutorial." IEEE access 2 (2014): 652-687. (Year: 2014).*

(Continued)

*Primary Examiner* — Andre D Boyce
(74) *Attorney, Agent, or Firm* — Shumaker, Loop & Kendrick, LLP

(57) ABSTRACT

A system for performing real time data analytics in a supply chain environment. The system receives data file from a user. The system then identifies a plurality of data definitions present in the data file upon analysing the software system installed on the user's machine. Further, the system compares the plurality of data definitions with a master definitions based on the metadata corresponding to the software system and a trained data definition model. Subsequently, the system transforms the plurality of data definitions into the master definitions using a set of data transformation techniques. A transformed data file based on the transformation of the plurality of data definitions is created. Finally, the system links the transformed data file with the master data in real time to remotely access the transformed data file in real time for performing data analytics in a supply chain environment.

9 Claims, 2 Drawing Sheets

(56) References Cited

U.S. PATENT DOCUMENTS

| | | | |
|---|---|---|---|
| 2019/0121673 A1* | 4/2019 | Gold | G06F 16/245 |
| 2019/0171365 A1* | 6/2019 | Power | G06F 3/0649 |
| 2019/0361697 A1* | 11/2019 | Hu | G06F 8/433 |
| 2020/0082890 A1* | 3/2020 | Karr | G06F 3/0688 |
| 2021/0112101 A1* | 4/2021 | Crabtree | H04L 63/1425 |
| 2022/0197763 A1* | 6/2022 | Jibaja | G06F 11/2023 |
| 2022/0237037 A1* | 7/2022 | Jibaja | G06F 9/4856 |
| 2022/0301031 A1* | 9/2022 | Lyer | G06Q 30/0623 |

OTHER PUBLICATIONS

Gogineni, Sonika, et al. "Systematic design and implementation of a semantic assistance system for aero-engine design and manufacturing." International Journal of Metadata, Semantics and Ontologies 15.2 (2021): 87-103. (Year: 2021).*

International Search Report (ISR) for PCT/IN2022/050639, dated Oct. 26, 2022 (4 pages).

Written Opinion (WO) for PCT/IN2022/050639, dated Oct. 26, 2022 (7 pages).

* cited by examiner

DATA ANALYTICS IN SUPPLY CHAIN

TECHNICAL FIELD

The present subject matter described herein, in general, relates to data analytics in a supply chain environment.

BACKGROUND

In recent times, data analysis has become very critical for any enterprise. Generally, a supply chain includes one or more enterprises that need to communicate and cooperate to ensure that goods and/or services are moved from distributors to consumers in a timely, and efficient manner. Traditionally, supply chain data is stored in multiple databases or multiple locations and multiple formats. This increases data processing complexity and consequently reduces efficiency in supply chain operations. Thus, there is still a need for an improved system for managing supply chain data with accuracy.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for performing real time data analytics in a supply chain environment. This summary is not intended to identify essential features of the claimed subject matter nor is it intended for use in determining or limiting the scope of the claimed subject matter.

In one implementation, a method for performing real time data analytics in a supply chain environment is disclosed. Initially, a data file may be received from a user. The data file may be generated using a plug-in installed on a user's machine. Further, a plurality of data definitions present in the data file may be identified upon analysing a software system installed on the user's machine. The plurality of data definitions may be identified based on metadata corresponding to the software system. Subsequently, the plurality of data definitions may be compared with a master definitions based on the metadata and a trained data definition model. The master definitions may be present in a central repository. The master definitions may be format agnostic. The master definitions may correspond to master data. The master data may comprise data files from a plurality of user machine running different software system. Further, the plurality of data definitions may be transformed into the master definitions using a set of data transformation techniques. The plurality of data definitions may be transformed based on the comparison. Furthermore, a transformed data file may be created based on the transformation of the plurality of data definitions. It may be noted that the transformed data file may be a subset of the master data. The transformed data file may comprise the master definitions. Subsequently, the transformed data file may be automatically linked with the master data in real time using Artificial Intelligence (AI) and Machine Learning (ML) techniques. Finally, the transformed data file may be remotely accessed in real time for performing data analytics as per the master definitions defined for a supply chain environment. In one aspect, the aforementioned method for performing real time data analytics in a supply chain environment may be performed by a processor using programmed instructions stored in a memory.

In another implementation, a non-transitory computer readable medium embodying a program executable in a computing device for performing real time data analytics in a supply chain environment is disclosed. The program may comprise a program code for receiving a data file from a user. The data file may be generated using a plug-in installed on a user's machine. Further, the program code may comprise a program code for identifying a plurality of data definitions present in the data file upon analysing a software system installed on the user's machine. The plurality of data definitions may be identified based on metadata corresponding to the software system. Subsequently, the program may comprise a program code for comparing the plurality of data definitions with a master definitions based on the metadata and a trained data definition model. The master definitions may be present in a central repository. The master definitions may be format agnostic. It may be noted that the master definitions correspond to master data. The master data may comprise data files from a plurality of user machine running different software system. Further, the program may comprise a program code for transforming the plurality of data definitions into the master definitions using a set of data transformation techniques. The plurality of data definitions may be transformed based on the comparison. Furthermore, the program code may comprise a program code for creating a transformed data file based on the transformation of the plurality of data definitions. The transformed data file may be a subset of the master data. The transformed data file may comprise the master definitions. Subsequently, the program may comprise a program code for automatically linking the transformed data file with the master data in real time using Artificial Intelligence (AI) and Machine Learning (ML) techniques. Finally, the program may comprise a program code for remotely accessing the transformed data file in real time for performing data analytics as per the master definitions defined for a supply chain environment.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for performing real time data analytics in a supply chain environment disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

Figure 1:
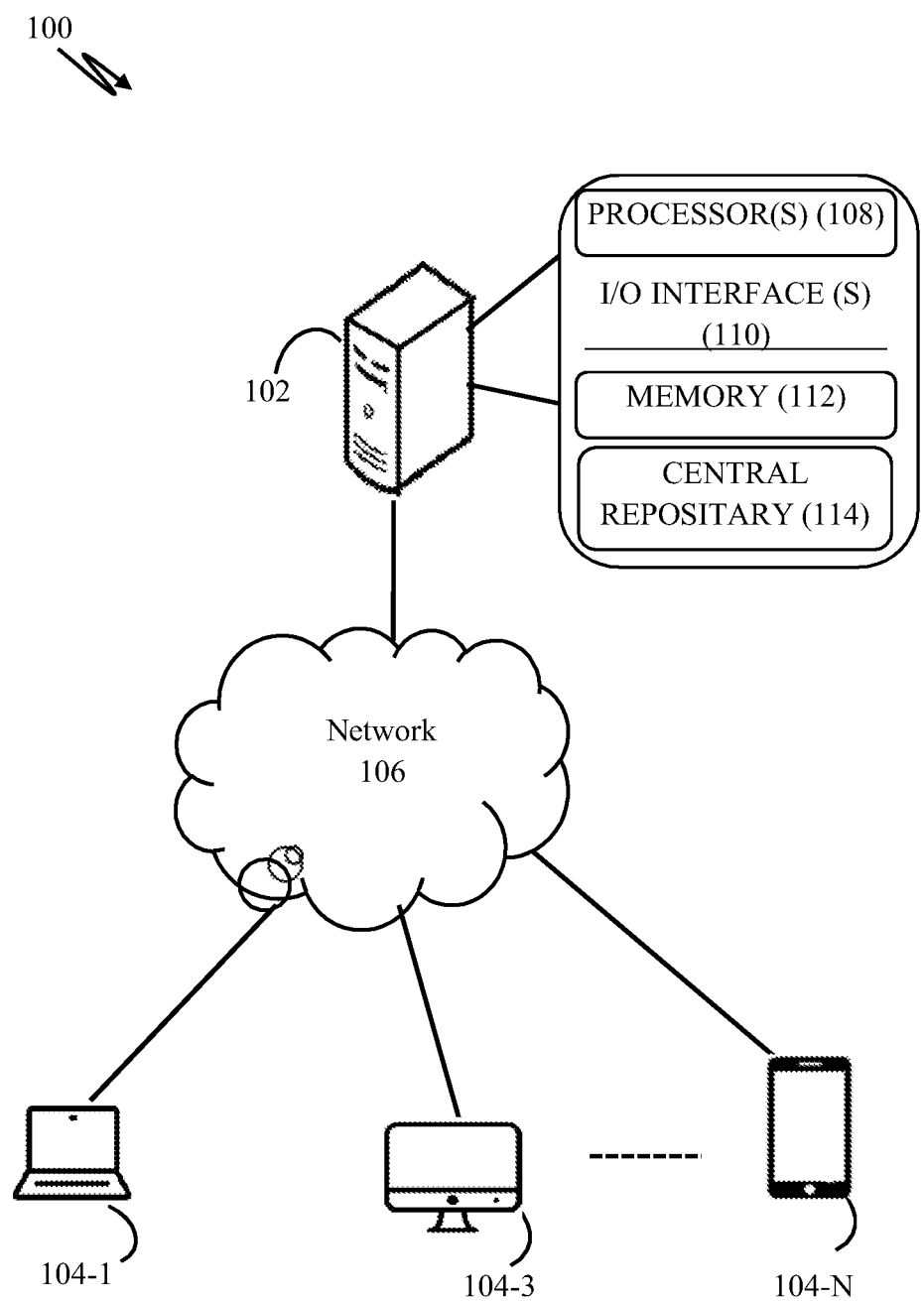
FIG. 1 illustrates a network implementation for performing real time data analytics in a supply chain environment, in accordance with an embodiment of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "comparing," "identifying," "transforming," "creating," "linking," "accessing," and other forms thereof, are intended to be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a method and a system for performing real time data analytics in a supply chain environment is disclosed. Initially, the system receives data file from a user. It may be noted that the user may be a distributor, a dealer, or a retailer. Further, the data file is generated by a plug-in installed at the user's machine. Let us assume that the system is installed at a distributor's machine. In the example, the system may receive the data file from the dealer and the retailer. Further, the system identifies a plurality of data definitions from the data present in the data file upon analysing a software system installed on the user's (dealer or retailer) machine. It may be noted that the software system installed on a dealer's machine may differ from another dealer or retailer. Thus, the plurality of data definition may be different when compared with each other.

Further, the system compares the plurality of data definitions with master definitions corresponding to master data. Furthermore, the system transforms the plurality of data definitions into the master definitions in order to make the data files consistent. The goal of the present invention is to transform the data file and link the data file to the master data in order to remotely access the transformed data file in real time for performing data analytics.

Referring now to FIG. 1, a network implementation 100 of a system 102 for performing real time data analytics in a supply chain environment is disclosed. Initially, the system 102 receives a data file from a user. In an example, the software may be installed on a user device 104-1. It may be noted that the one or more users may access the system 102 through one or more user devices 104-2, 104-3 . . . 104-N, collectively referred to as user devices 104, hereinafter, or applications residing on the user devices 104. The system 102 receives the data files from one or more user devices 104. Further, the system may also 102 receive a feedback from a user using the user devices 104.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It will be understood that the system 102 may be accessed by multiple users through one or more user devices 104-1, 104-2 . . . 104-N. In one implementation, the system 102 may comprise the cloud-based computing environment in which the user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an input/output (I/O) interface 110, a memory 112 and a central repository 114. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 and a central repository 114 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions. In another embodiment, the central repository 114 may be used to store the master definitions corresponding to the master data.

As there are various challenges observed in the existing art, the challenges necessitate the need to build the system 102 for performing real time data analytics in a supply chain environment. At first, a user may use the user device 104 to access the system 102 via the I/O interface 110. The user may register the user devices 104 using the I/O interface 110 in order to use the system 102. In one aspect, the user may access the I/O interface 110 of the system 102. The detail functioning of the system 102 is described below with the help of figures.

The present subject matter describes the system 102 for performing real time data analytics in a supply chain environment. The system 102 may receive a data file from a user. It may be noted that the data file may be generated using a plug-in installed on a user's machine. Further, the data file may be present in a format compatible to the software system. The data file may comprise at least a sales file, a product file, a retailer file, a purchase file, and an adjustment file. The sales file may comprise invoice number, outlet name, product name, quantity of the product, value of the product, expiry date. The retailer file may comprise retailer name, retailer code, GST number, and address. The purchase file may comprise purchase date, voucher number, supplier code, quantity, value. The adjustment file may comprise stock adjustment entries. In an example, the system 102 may receive the data files from one or more user devices. It may be noted that the plug-in may be installed on the one or more user devices.

In an example, let us assume that the plug-in is installed on the user's machine. Further, the plug-in may generate the data file from data available at the user's machine. In an embodiment, the data may be structured or unstructured. The data may comprise documents related to sales, inventory, customer information and a like. Furthermore, when the connection between the system 102 and the plug-in is established the system 102 starts to receive the data files generated by the plug-in. It may be noted that the system 102 receives the data files from the user's machine automatically. In another embodiment, the user may also schedule generation of the data file and an interval to send the data file to the system 102.

Further to receiving the data files, the system 102 may identify a plurality of data definitions present in the data file upon analysing a software system installed on the user's machine. It may be noted that the plurality of data definitions may be identified based on metadata corresponding to the software system. The metadata may comprise data definitions and predefined mappings, and product codes (item codes). The software system may include, but not limited to, Tally®, SAP ERP®, Busy ERP, WinSpirit, Focus, Medivision etc.

In the above example, after receiving the data files the system 102 may identify the plurality of data definitions present in the data file. Let us assume that the software system is Tally®. It may be noted that the plurality of data definitions may be identified based on the metadata of the Tally®.

Further to identifying, the system 102 may compare the plurality of data definitions with master definitions. It may be noted that the comparison is based on the metadata and a trained data definition model. The master definitions may be present in a central repository 114. Further, the master definitions may be format agnostic. In other words, the master definition may remain the same regardless of the format of the data file. The master definitions may correspond to master data. It may be noted that the master data may comprise data files from a plurality of user machines running different software system. Further, the trained data definition model may comprise data definitions of the plurality of software systems present on different user machines, historical data files, different formats corresponding to the different user machines. The trained data definition model may be created using a Deep Learning Algorithm. Further, the data definition model is trained continuously when a new software system is available.

Further to comparing, the system 102 may transform the plurality of data definitions into the master definitions using a set of data transformation techniques. The plurality of data definitions may be transformed based on the comparison. The data transformation technique may include, but not limited to, Fourier transformation, correcting semantic errors in the data file, Data deduplication, checking correct data format, correcting the data with reference to the import and storage in database, updating data definitions by comparing the data definitions with the master definitions and changing data format.

Further to transforming, the system 102 may create a transformed data file based on the transformation of the plurality of data definitions. The transformed data file may be a subset of the master data. It may be noted that the transformed data file comprises the master definitions.

Consider an example, let us assume that the master definition may comprise invoice number, outlet name, product name, quantity of the product, value of the product, expiry date. Further, the plurality of data definitions in the data file may be bill number, shop name, item name, quantity of the product, price of the product, expiry date. The system 102 may transform the plurality of data definitions into the master definitions using a set of data transformation techniques. Further, the system 102 may create a transformed data file comprising master data definitions. In the above example, the system may create a transformed data file comprising invoice number, outlet name, product name, quantity of the product, value of the product, expiry date.

Further to creating the transformed data file, the system 102 may automatically link the transformed data file with the master data in real time using Artificial Intelligence (AI) and Machine Learning (ML) techniques. In an embodiment, the linking step may be performed manually. In another embodiment, a human may validate the AI based linking of the transformed data file with the master data.

Consider an example, a distributor buys products from a manufacturing company and sells the products to one or more dealers. Further, the one or more dealers may sell the products to one or more retailers. Furthermore, the one or more retailers may sell the products to one or more consumers. In the example, the system 102 is installed at the distributor. Let us assume that the master data comprises data related to one or more dealers and one or more retailers. It may be noted that the distributor may define master definitions corresponding to the master data. Further, the system 102 may receive data files from a billing or accounting software installed with one or more dealers. It may be noted that the one or more dealers may use different software system (tally, SAP ERP, e.tc.). The system 102 may identify a plurality of data definitions present in the data files upon analysing the software system installed on the dealer's system. Further, the system 102 may compare the data files with the with the master definitions. The system then transforms the plurality of data definitions into the master definitions to create a transformed data. Further, the system 102 links the transformed data to the master data.

Further to linking, the system 102 may remotely access the transformed data file in real time for performing data analytics as per the master definitions defined for a supply chain environment. In the above example, the distributor may remotely access the transformed data file in real time for performing data analytics. It may be noted that the distributor may access the transformed data file of the one or more dealers.

Figure 2:
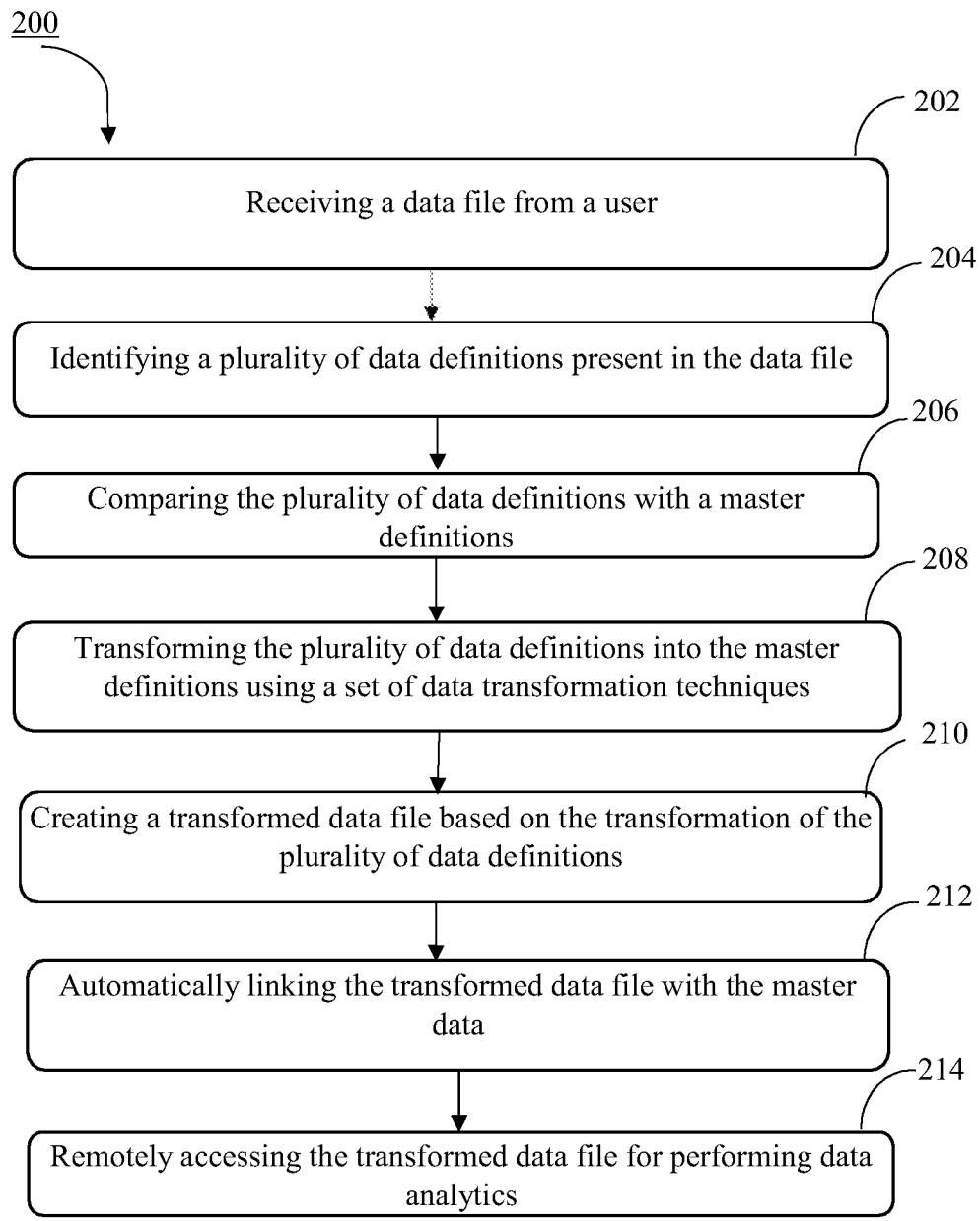
FIG. 2 illustrates a method for performing real time data analytics in a supply chain environment, in accordance with an embodiment of the present subject matter.

Referring now to FIG. 2, a method 200 for performing real time data analytics in a supply chain environment is shown, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 is described is not intended to be construed as a limitation, and any number of the described method blocks can be combined in any order to implement the method 200 or alternate methods for performing real time data analytics in a supply chain environment. Additionally, individual blocks may be deleted from the method 200 without departing from the scope of the subject matter described herein. Furthermore, the method 200 for performing real time data analytics in a supply chain environment can be implemented in any suitable hardware, software, firmware, or combination thereof. However, for ease of explanation, in the embodiments described below, the method 200 may be considered to be implemented in the above-described system 102.

At block 202, a data file may be received from a user. The data file may be generated using a plug-in installed on a user's machine.

At block 204, a plurality of data definitions present in the data file may be identified upon analysing a software system installed on the user's machine. The plurality of data definitions may be identified based on metadata corresponding to the software system.

At block 206, the plurality of data definitions may be compared with a master definitions based on the metadata and a trained data definition model. The master definitions may be present in a central repository 114.

At block 208, the plurality of data definitions may be transformed into the master definitions using a set of data transformation techniques. The plurality of data definitions may be transformed based on the comparison.

At block 210, a transformed data file may be created based on the transformation of the plurality of data definitions. It may be noted that the transformed data file may be a subset of the master data. The transformed data file may comprise the master definitions.

At block 212, the transformed data file may be automatically linked with the master data in real time using Artificial Intelligence (AI) and Machine Learning (ML) techniques.

At block 214, the transformed data file may be remotely accessed in real time for performing data analytics as per the master definitions defined for a supply chain environment.

Exemplary embodiments discussed above may provide certain advantages.

Though not required to practice aspects of the disclosure, these advantages may include those provided by the following features.

Some embodiments of the system and method help the user to obtain transformed data from the data files. It may be noted that the transformed data do not contain any duplicate entries.

Some embodiments of the system and method helps the user to link the data files when the data definitions are not same as the master definition. The system uses Artificial Intelligence (AI) and Machine Learning (ML) techniques for linking process.

Some embodiments of the system and method helps the user to remotely access the transformed data file in real time for performing data analytics.

Some embodiment of the system and method helps to identify a plurality of data definitions present in the data file by analysing a software system installed on the user's machine.

Some embodiment of the system and method helps to perform real time data analytics in a supply chain environment.

Although implementations for methods and system for performing real time data analytics in a supply chain environment have been described in language specific to structural features and/or methods, it is to be understood that the appended claims are not necessarily limited to the specific features or methods described. Rather, the specific features and methods are disclosed as examples of implementations for performing real time data analytics in a supply chain environment.

We claim:

1. A method for performing real time data analytics in a supply chain environment, the method comprising:

receiving, by a processor, a data file from a user, wherein the data file is generated using a plug-in installed on a user's machine;

identifying, by the processor, a plurality of data definitions present in the data file upon analysing a software system installed on the user's machine, and wherein the plurality of data definitions is identified based on metadata corresponding to the software system;

comparing, by the processor, the plurality of data definitions with a master definition based on the metadata and a trained data definition model, wherein the master definitions are present in a central repository, and wherein the master definitions are format agnostic, and wherein the master definitions correspond to master data, and wherein the master data comprises data files from a plurality of user machine running different software system;

transforming, by the processor, the plurality of data definitions into the master definitions using a set of data transformation techniques, wherein the plurality of data definitions is transformed based on the comparison between the plurality of data definitions and the master definitions;

creating, by the processor, a transformed data file based on the transformation of the plurality of data definitions, wherein the transformed data file is a subset of the master data, and wherein the transformed data file comprises the master definitions;

automatically linking, by the processor, the transformed data file with the master data in real time using Artificial Intelligence (AI) and Machine Learning (ML) techniques; and remotely accessing, by the processor, the transformed data file in real time for performing data analytics as per the master definitions defined for a supply chain environment.

2. The method as claimed in claim 1, wherein the trained data definition model comprises data definitions of plurality of software systems present on different user machines, historical data files, different format corresponding to the different user machines, and wherein the trained data definition model is created using a Deep Learning Algorithm.

3. The method as claimed in claim 1, wherein the metadata comprises data definitions and predefined mappings, and item codes.

4. The method as claimed in claim 1, wherein the data file comprises at least a sales file, a product file, a retailer file, a purchase file, and an adjustment file.

5. A system for performing real time data analytics in a supply chain environment, the system comprising:

a memory; and a processor coupled to the memory, wherein the processor is configured to execute program instructions stored in the memory for:

receiving a data file from a user, wherein the data file is generated using a plug-in installed on a user's machine;

identifying a plurality of data definitions present in the data file upon analysing a software system installed on the user's machine, and wherein the plurality of data definitions is identified based on metadata corresponding to the software system;

comparing the plurality of data definitions with a master definition based on the metadata and a trained data definition model, wherein the master definitions are present in a central repository, and wherein the master definitions are format agnostic, and wherein the master definitions correspond to master data, and wherein the master data comprises data files from a plurality of user machine running different software system;

transforming the plurality of data definitions into the master definitions using a set of data transformation techniques, wherein the plurality of data definitions is transformed based on the comparison between the plurality of data definitions and the master definitions;

creating a transformed data file based on the transformation of the plurality of data definitions, wherein the transformed data file is a subset of the master data, and wherein the transformed data file comprises the master definitions;

automatically linking the transformed data file with the master data in real time using Artificial Intelligence (AI) and Machine Learning (ML) techniques; and remotely accessing the transformed data file in real time for performing data analytics as per the master definitions defined for a supply chain environment.

6. The system of claim 5, wherein the trained data definition model comprises data definitions of plurality of software systems present on different user machines, historical data files, different format corresponding to the different user machines, and wherein the trained data definition model is created using a Deep Learning Algorithm.

7. The system of claim 5, wherein the metadata comprises data definitions and predefined mappings, and item codes.

8. The system of claim 5, wherein the data file comprises at least a sales file, a product file, a retailer file, a purchase file, and an adjustment file.

9. A non-transitory computer program product having embodied thereon a computer program for performing real time data analytics in a supply chain environment, the computer program product storing instructions, the instructions for:

receiving a data file from a user, wherein the data file is generated using a plug-in installed on a user's machine;

identifying a plurality of data definitions present in the data file upon analysing a software system installed on the user's machine, and wherein the plurality of data definitions is identified based on metadata corresponding to the software system;

comparing the plurality of data definitions with a master definitions based on the metadata and a trained data definition model, wherein the master definitions are present in a central repository, and wherein the master definitions are format agnostic, and wherein the master definitions correspond to master data, and wherein the master data comprises data files from a plurality of user machine running different software system;

transforming the plurality of data definitions into the master definitions using a set of data transformation techniques, wherein the plurality of data definitions is transformed based on the comparison between the plurality of data definitions and the master definitions;

creating a transformed data file based on the transformation of the plurality of data definitions, wherein the transformed data file is a subset of the master data, and wherein the transformed data file comprises the master definitions;

automatically linking the transformed data file with the master data in real time using Artificial Intelligence (AI) and Machine Learning (ML) techniques; and remotely accessing the transformed data file in real time for performing data analytics as per the master definitions defined for a supply chain environment.

* * * * *